(12) United States Patent
LePoutre et al.

(10) Patent No.: US 7,836,027 B2
(45) Date of Patent: Nov. 16, 2010

(54) METHOD AND APPARATUS FOR COMMUNICATING LIST ORDERS

(75) Inventors: Richard A. LePoutre, Old Saybrook, CT (US); Clive K. Thomas, Vernon, CT (US)

(73) Assignee: Statware, Inc., Centerbrook, CT (US)

( * ) Notice: Subject to any disclaimer, the term of this patent is extended or adjusted under 35 U.S.C. 154(b) by 220 days.

(21) Appl. No.: 11/474,052

(22) Filed: Jun. 22, 2006

(65) Prior Publication Data

US 2007/0067307 A1    Mar. 22, 2007

Related U.S. Application Data

(60) Provisional application No. 60/693,331, filed on Jun. 22, 2005.

(51) Int. Cl.
*G06F 7/00* (2006.01)
(52) U.S. Cl. ..................................... 707/694
(58) Field of Classification Search ........................ None
See application file for complete search history.

(56) References Cited

U.S. PATENT DOCUMENTS

| | | | | |
|---|---|---|---|---|
| 7,058,626 B1 * | 6/2006 | Pan et al. ....................... | 707/4 |
| 7,281,236 B1 * | 10/2007 | Galvin et al. ................. | 717/104 |
| 2002/0062241 A1 * | 5/2002 | Rubio et al. .................. | 705/10 |
| 2002/0188524 A1 * | 12/2002 | Shimizu ....................... | 705/26 |
| 2003/0154277 A1 * | 8/2003 | Haddad et al. ............... | 709/224 |
| 2005/0149489 A1 * | 7/2005 | Abjanic et al. ................ | 707/1 |
| 2006/0190813 A1 * | 8/2006 | Neil et al. ..................... | 715/513 |
| 2006/0218194 A1 * | 9/2006 | Yalamanchi ............. | 707/104.1 |
| 2008/0255982 A1 * | 10/2008 | Hughes et al. ................ | 705/37 |

* cited by examiner

*Primary Examiner*—Wilson Lee
*Assistant Examiner*—Belinda Xue
(74) *Attorney, Agent, or Firm*—Ware, Fressola, Van Der Sluys & Adolphson, LLP

(57) ABSTRACT

A terminal for use by a list broker, a terminal for use by a list manager, and a terminal for use by a service bureau (list provider) of a supply chain in the list industry, each terminal including means for translating to and/or from native format an indication of a subset of a list expressed in XML. An intermediate node is also provided, for optional use as a router and validator of XML statements exchanged between the elements of the supply chain. Advantageously, the indication of a subset of a list expressed in XML is provided using terms (tagged field values serving as select filter parameters) from a with the tags according to a list of terms in an XML schema description, and the possible values, in some embodiments, according to a predetermined "lingo" or, in other words, a standardized vocabulary. Corresponding methods are also provided.

19 Claims, 3 Drawing Sheets

METHOD AND APPARATUS FOR COMMUNICATING LIST ORDERS

CROSS REFERENCE TO RELATED APPLICATION

Reference is made to and priority claimed from U.S. provisional application Ser. No. 60/693,331 filed Jun. 22, 2005.

BACKGROUND OF THE INVENTION

The present invention pertains to the list industry, and more particularly to the automation of transaction processing among list brokers, list managers, and service bureaus.

The list industry is built up around the selling and buying of information in the form of lists; the lists themselves are typically not sold, but only rented, i.e. copies of the lists are rented. As shown in FIG. 1, a transaction related to the buying or selling of information in the form of lists can involve different entities, forming what is known as a supply chain, including clients acting as mailers, list brokers, list managers, service bureaus, and list owners.

List owners own the list properties that are placed into the market for rent. Mailers are the renters of list properties and in almost all cases are list owners themselves. List brokers take orders from their clients and introduce orders into the supply chain. List managers manage a list for a list owner, receive orders from list brokers and submit orders for fulfillment to service bureaus. Service bureaus store the actual list data, receive and execute orders from list managers, and deliver the deliverable to the list broker's client, bonded mail house or other point-of-use. List marketers compile and publish extensive and comprehensive catalogs of lists commonly called datacards. Datacards are also compiled internally by list brokers. Datacards specify the general characteristics of a list, including its content, permissible (but not all) select filters used to obtain subsets of the content, miscellaneous ordering options, and for each orderable item, the unit of purchase and rate. List brokers use datacards from list marketers to determine the lists and the select filters that might best satisfy a client's requirements.

A list is a list of names having associated properties and manner of delivery and use. Usually only a subset (or multiple subsets) of a list is needed. The subset is selected from the whole list using one or more filters to filter out all except the desired content by comparing one or more of the properties of the list with select criteria. A filter is therefore commonly referred to as a "select" and the filter's constraint may be specified by a code, a single value or range of values, or a combination thereof. Combinations of constraints can be applied (in which case each is logically "AND'ed" with the others providing a so-called multiple filter), and/or alternative constraints can be applied (in which case each is logically "OR'ed" providing a so-called composite filter). (In addition, corresponding excluding constraints can also be applied, i.e. "AND NOT" and/or "OR NOT.")

In a typical order for a subset of a list, a mailer (list purchaser) indicates a subset of a list to a broker. The broker then issues an order for the subset using a select filter expressed in ordinary English. A list manager then reviews the order, typically refining it in the process, based on industry knowledge or familiarity with the particular list referred to in the order. The list manager will then send the reviewed list onto a service bureau, which will then fulfill the order. The communication from the broker to the list manager and the communication from the list manager to the service bureau are typically via facsimile, or can be electronic (e.g. an email), but are usually not communications between automated processes.

Thus, an order arriving at a service bureau is typically keyed into an automated system at the service bureau after arriving by facsimile from a list manager. This is because the native format for representing an order can differ from facility to facility. Thus, if an automated process is used for specifying a list at one facility in the supply chain, it may not be able to communicate with an automated system at another facility in the supply chain because the other facility might use an automated process that represents a list differently.

As mentioned, a select filter is often today expressed in ordinary English. Using ordinary English to indicate a subset of a list (or lists) often causes ambiguity, and so the mailer (list renter) sometimes does not end up with the desired subset. Further, the keying in of an order when it arrives at a supply chain facility is a source of error, cost and delay.

What is needed therefore is a lingua franca—i.e. a common trade language or lingo—by which automated processes of entities of the supply chain could communicate with each other, even if some ambiguity exists. Ideally, though, a standardized trade language would be provided sufficient in its vocabulary to provide precise expressions for orders of all possible subsets of any list, and so eliminating all ambiguity in orders for subsets of lists.

DISCLOSURE OF INVENTION

Accordingly, in a first aspect of the invention, a list-specifying terminal is provided, comprising: ordering means, responsive to an indication of a subset of a list, for providing an order for the subset of a list in a native format; translating means, responsive to the order for the subset of the list in the native format, for providing an order for the subset of the list indicating the subset of the list using XML (Extensible Markup Language), as set out e.g. in XML standards documents published by the World Wide Web Consortium on the Internet; and communication means, responsive to the order for the subset of the list indicating the subset of the list using XML, for encapsulating the order in a message having a header indicating a destination or indicating that the message includes an order for a subset of a list, and for communicating the message over a communication channel.

In accord with the first aspect of the invention, the XML may provide a select filter using tag values chosen from a predetermined set of tag values. Further, the predetermined set of tag values and predetermined definitions for the tag values may be provided by an XSD (XML Schema Description) file.

Also in accord with the first aspect of the invention, the native format may be a binary-encoded representation of data in terms of data structures defined within a computer program compiled into machine language, for providing computer processor instructions for the ordering means.

Also in accord with the first aspect of the invention, the computer programming language may provide classes of objects for use in indicating instructions to the computer.

Also in accord with the first aspect of the invention, the computer programming language may be or may be a variant of visual basic or C++ or C-sharp.

Also in accord with the first aspect of the invention, the list-specifying terminal may also comprise a receiving and de-translating means, for receiving the order for the subset of the list indicating the subset of the list using XML, and for translating the order into the native format.

Also in accord with the first aspect of the invention, the ordering means may provide the native format to the translating means by passing the native format to the translating means via an application program interface. As an alternative, the translating means may obtain the native format from the ordering means via a data store.

In a second aspect of the invention, a list-providing terminal is provided, comprising: a receiving and de-translating means, for receiving an order for a subset of a list indicating the subset of the list using XML, and for translating the order into a native format; and a list providing means, responsive to a stored copy of the list, for providing the subset of the list based on the indication of the subset of the list in the native format.

In a third aspect of the invention, an intermediate-node server is provided, comprising: receiving and checking means, responsive to a message from a sending element of a supply chain wherein the message encapsulates an order for a subset of a list indicating the subset of the list using XML, for validating or not validating the XML by determining whether the XML includes only statements allowed according to a predetermined XSD, for providing the message encapsulating the validated or non-validated XML; and routing means, responsive to the message encapsulating the validated or non-validated XML, for routing the message to the sender element of the supply chain if the XML is not validated, and for routing the message to a next element of the supply chain if the XML is validated.

In accord with the third aspect of the invention, the intermediate node may further comprise means for storing the XSD and for making the XSD available to a process communicatively coupled to the server.

In a fourth aspect of the invention, a system is provided, comprising: a list ordering terminal and a list manager terminal both according to the first aspect of the invention, and a service bureau terminal according to the second aspect of the invention, all communicatively coupled via an intermediate node server according to the third aspect of the invention.

In a fifth, sixth and seventh aspect of the invention, methods are provided by which the equipment of the first, second and third aspects of the invention are operative, respectively.

In an eighth, ninth and tenth aspect of the invention, a computer program product is provided, comprising a computer readable storage structure embodying computer program code thereon for execution by a computer processor, wherein said computer program code comprises instructions for performing a method according to the fifth, sixth and seventh aspects of the invention, respectively.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
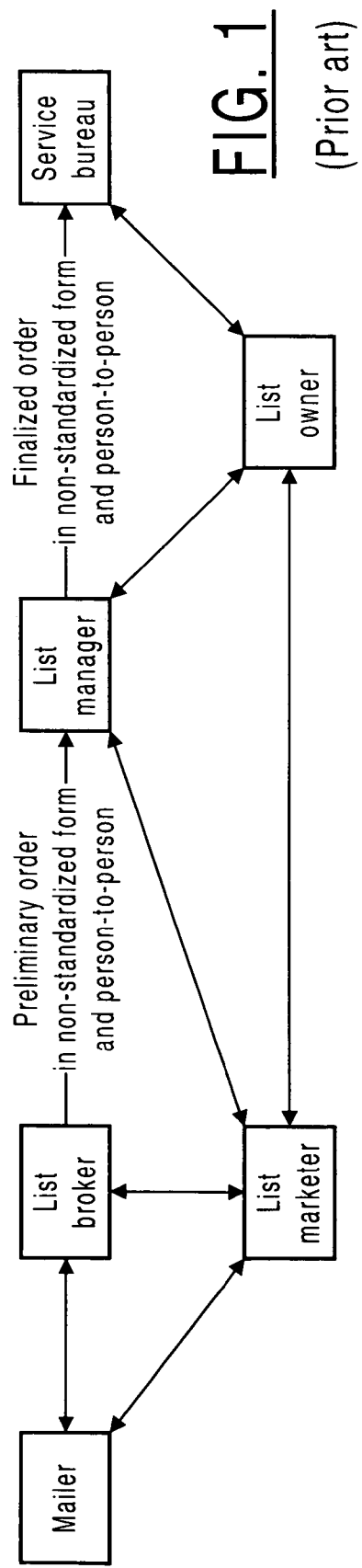
FIG. 1 is a block diagram/flow diagram of a supply chain of the list industry, according to the prior art.
Figure 2:
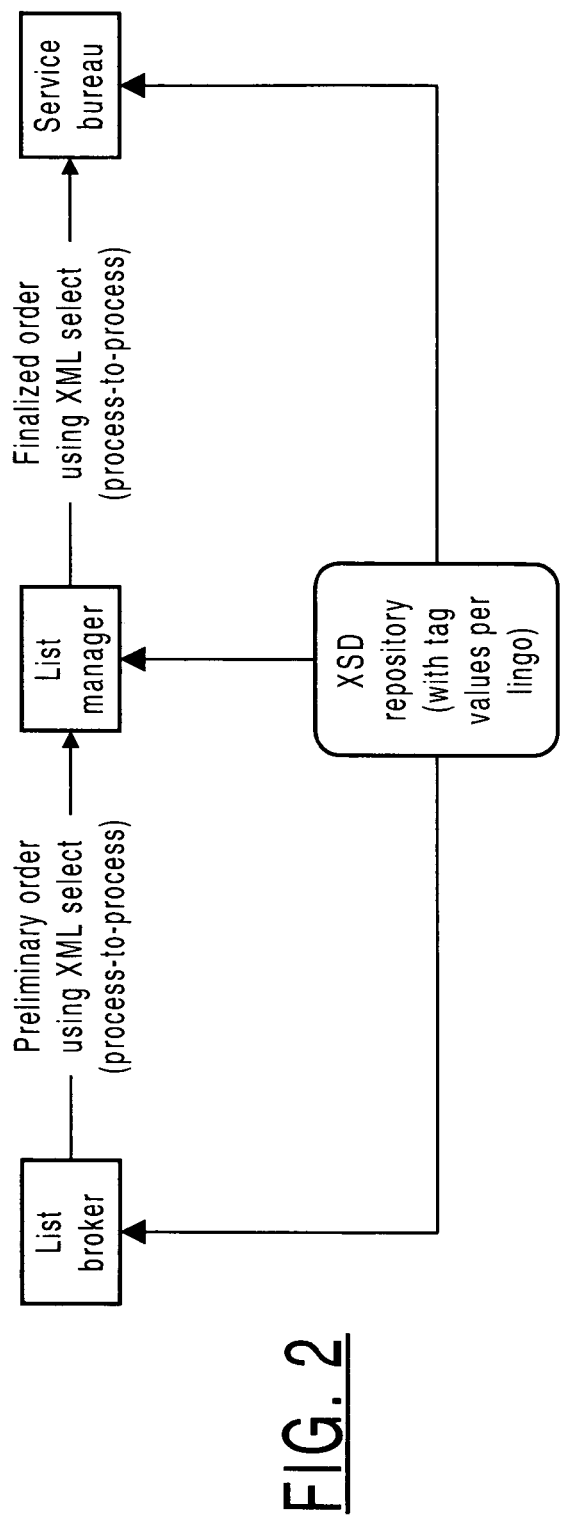
FIG. 2 is a block diagram/flow diagram of a portion of the supply chain of FIG. 1, according to the invention.

Referring now to FIG. 2, according to the invention, instead of person-to-person communication of an order including an indication of a subset of a list (or lists), at least some entities of a list supply chain, and in particular the list brokers, list managers, and service bureaus, use computer terminals to communicate to each other information regarding a subset of a list using a computer-computer message indicating the subset of the list in XML (extensible markup language), according to a pre-determined XSD (XML schema description). XML is a language that indicates the role or meaning of a value by associating the value with a tag named when providing the value. Thus, e.g., XML might include a statement such as (but not in the form here) "job title=president" in which "job title" is a named tag and "president" is a tag value for the named tag. The possible tags/tag fields themselves (as opposed to their possible values) are typically indicated in the XML schema description file.

Each of the above supply chain entities typically processes information regarding the list with the list expressed in what is commonly called a native format (native to the computer language used in implementing the functionality of the terminal in respect to the list subset ordering and providing, and typically non-XML, at least insofar as not using the XML schema description provided according to the invention), and so includes, according to the invention, a translator from the native format into XML, and typically also a translator (or what might be called a de-translator) from XML into the native format. The XML, in order to indicate the subset of the list, includes one or more select filters, provided using tag values according to the XSD.

A native format can be and often is a proprietary file format, but is at least to be understood here as a non-standardized file format (i.e. it is not standardized among separate business entities) of a given application, a format not intended to be opened by any other application and therefore usually unsuitable for transferring data from one application to another. So a native format can be understood to be any format that is not according to an accepted standard, and is instead developed specifically for a given application. A native format need not be proprietary, and indeed sometimes application developers will provide information about a native format used for an application so as to allow data in the native format to be interpreted by other applications using a translator or converter utility.

Figure 3:
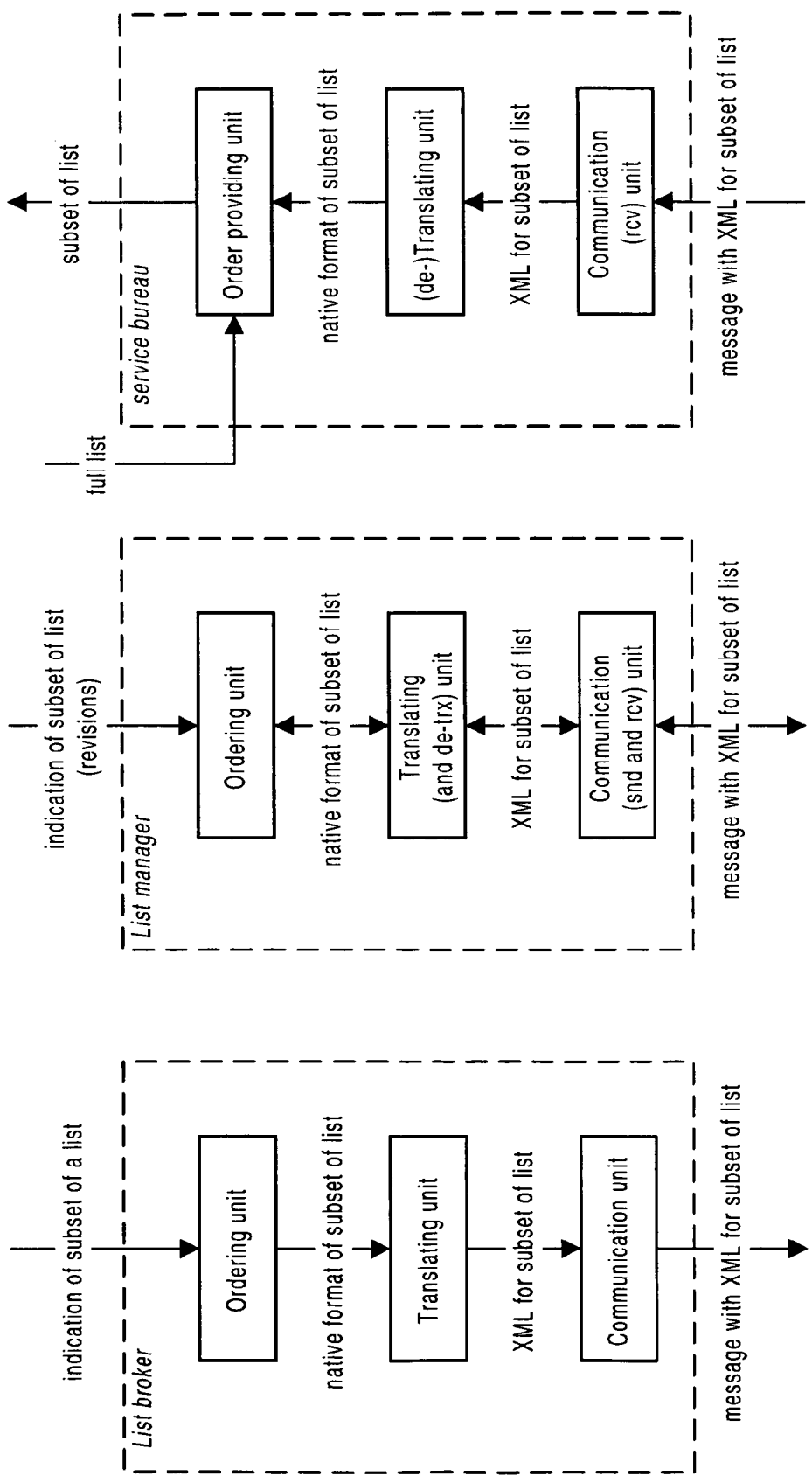
FIG. 3A is a block diagram/flow diagram illustrating functionality of the list broker terminal of FIG. 2.
FIG. 3B is a block diagram/flow diagram illustrating functionality of the list manager terminal of FIG. 2.
FIG. 3C is a block diagram/flow diagram illustrating functionality of the service bureau terminal of FIG. 2.

Referring still to FIG. 2 and now also to FIG. 3A, a list broker terminal, having received an indication of a subset of a list (usually originally from a mailer, which might then be manually input by a user of the list broker terminal), provides a message indicating a preliminary version for an order for the subset of the list, with the subset of the list in XML, per the XSD which, advantageously, is available electronically, as shown in FIG. 2. The indication of the subset is originally received by an ordering unit of the list broker terminal, and represented in the native format of the ordering unit. A translating (trx) unit then translates the indication of the subset into XML. Finally, a communication unit communicates a message including the indication of the subset over a communication channel.

Still referring to FIG. 2 and now also to FIG. 3B, the message from the list broker terminal is received by a communication unit (a send/snd and receive/rcv unit) of a list manager terminal, and the indication of the subset in XML is (de-)translated into the native format used by an ordering unit of the list manager terminal (not necessarily the same as the ordering unit of the list broker). (The terminology "de-translating is used here sometimes to indicate translating from XML into a native format, as opposed to translating in the other direction.) The native format of the list manager ordering unit can be, but need not be, different than the native format used by the (ordering unit of the) list broker terminal. A user of the list manager terminal or an automated process running on the list manager terminal (not shown), or both, reviews the specification of the subset of the list (with the subset indicated in the native format of the list manager terminal), and can amend the indication of the subset, or approve it as is. In case the indication of the subset is amended, the list manager terminal can then be said to have received an (amended) indication of the subset. The user then commands the list manager terminal to communicate the order (as a message) to a service bureau for fulfillment as a finalized order in XML so that the service bureau (or another, communicatively coupled to the first) can provide the subset of the list using a copy of the full list available to the service bureau fulfilling the order. (It is also provided back to the list broker terminal, to appraise the list broker of changes to the order made by the list manager.) Thus, again, the indication of the subset must be translated into XML from the native format for communication to the service bureau. The translating unit of the list manager terminal provides the XML from the native format, and the (send and receive) communication unit of the list manager communicates the message to the service bureau.

Still referring to FIG. 2 and now also to FIG. 3C, at the service bureau, the message is received by a (receive/rcv) communication unit, and the XML indicating the subset of the list is extracted and translated into the native format of a order providing unit of the service bureau by a (de-) translating unit. The order providing unit then uses the indication of the subset of the list and a copy of the full list to provide the indicated subset of the list.

Advantageously, the ordering unit of a list-specifying terminal (a list broker terminal or a list manager terminal) provides the native format to the translating unit by passing the native format to the translating means via an application program interface. For example, the ordering unit is implemented as one or more so-called objects in an object-oriented programming language (an object being a unit of code that performs a function in response to receiving a message, and provides a response to the message based on the function performed), and the translating unit is similarly implemented, and the ordering unit provides the native format version to the translating unit as an object-to-object message. Similarly, the translating unit communicates the XML to the communication unit as an object-to-object message. Alternatively, the ordering unit, translating unit and communication unit exchange information by the sender storing the information in a data store for the receiver to obtain by reading the data store at a later time.

In all this, not only the list broker terminal, but also the list manager terminal and service bureau terminal advantageously use the XSD to interpret the XML included in the message and indicating the subset of the list.

Although the above description refers to a list broker terminal, a list manager terminal, and a service bureau terminal, the functionality described above—i.e. e.g. the ordering functionality, translating functionality, communication functionality, and list providing functionality—can of course be provided by modules hosted by more than a single respective terminal.

Figure 4:
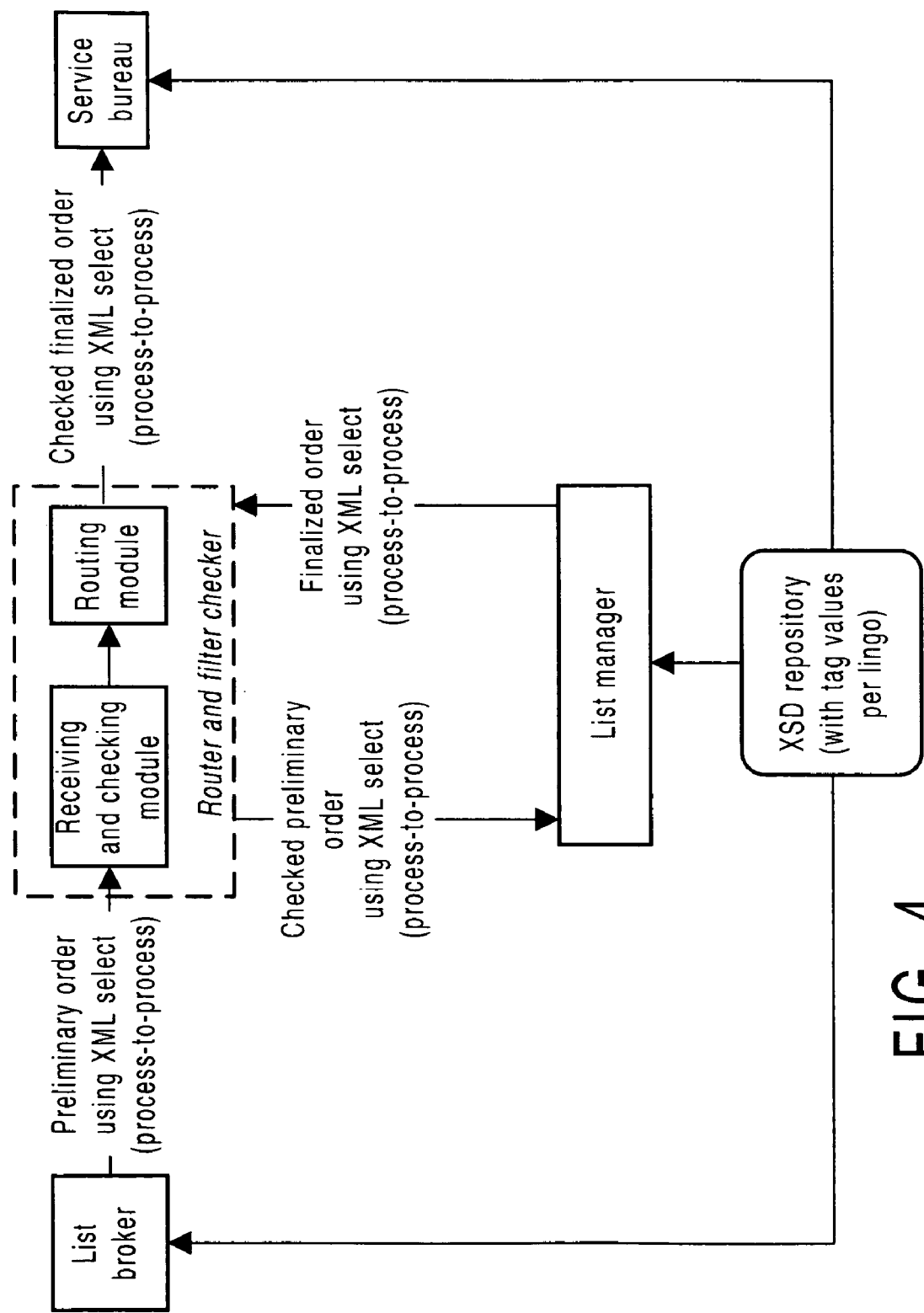
FIG. 4 is a block diagram/flow diagram illustrating an embodiment of the invention providing an intermediate node server, acting as a router and validator of messages communicated between entities of the supply chain of FIG. 2.

Referring now to FIG. 4, according to an advantageous embodiment of the invention, the list broker terminal, list manager terminal, and service bureau terminal communicate as described above not directly, but instead via an intermediate node server, acting as a routing and checking node. Thus, as shown, a list broker communicates in a message a preliminary order (i.e. an order including an indication of a subset of a list using possibly erroneous XML statements), and the intermediate routing and checking node parses the XML included in the message in order to validate the XML based on the XSD (to which the router and checker node has access). Also as shown, the list manager communicates a preliminary order to the intermediate node for validation and, if validated, routing to a service bureau.

Using an intermediate node for validation and routing is advantageous because it allows concentrating complexity (needed to perform the validation and routing) in a few locations (as many physically distinct intermediate nodes as are provided for the system), rather than at each list broker terminal, list manager terminal, and service bureau terminal of the supply chain. If a communication is not validated by the intermediate node, in some cases the error may be corrected by the intermediate node, but usually (and more prudently) a message including an error in its XML is returned to the sending entity with an indication of the error (e.g. "Expected semi-colon at end of above line").

The intermediate node routing function can allow a list broker or list manager to communicate a message to a next entity on the supply chain even if the address (e.g. a URL or e-mail address) is not known, or if only the table from which a subset is being ordered is known. The intermediate node can include tables of list brokers, list managers and service bureaus and can include in the tables cross references to lists managed by the list managers, or lists for which order fulfillment is provided by the service bureaus. In a system without such intermediate nodes, such complexity (at least in part) would have to exist at each list broker and list manager of the supply chain.

Although the above description may indicate that the list broker terminal, list manager terminal, service bureau terminal and intermediate node (router and checker) server all have access to an XSD as if the XSD were a stored file, the invention of course also encompasses embodiments in which the XSD is built into (or included with) one or more of the terminals and/or the intermediate node (server).

As explained above, the indication of a subset of a list is provided in XML using what is called a select filter. A select filter includes tags (names of fields) and tag values (values for the named fields). The invention encompasses using either ad hoc tag values, or tag values selected from a predetermined list of allowed tag values (or both). Advantageously, a standardized list of all possible values of all possible tags is used, and such tag values are further advantageously coded representations of tag values. Thus, e.g., for a tag indicating job title, a standardized set of tag values could include "JT01" representing company president or equivalent role in a business organization, "JT02" for executive vice president, and so on. The coded representation of tag values is provided by what is here referred to as a list order lingo.

As explained, according to the invention, a select is translated from a native format into XML according to an XSD, and advantageously, the tag field values (and even the tag fields themselves) are coded so as to represent what in ordinary English might be indicated differently. For example, ordinary English allows "Connecticut" or "CT" or "Conn." as different possible ways of indicating the state of Connecticut. In a coded representation advantageously (but not necessarily) according to the invention, the state of Connecticut might be indicated as ST06, which would then be a possible tag value for a tag indicating states of the United States. The corresponding tag field itself would be, in some embodiments, coded, as e.g. ST-US. Thus, an XML fragment indicating Connecticut, would be: <ST-US>ST06</ST-US>.

The coded representations are called here "lingo" and are intended to eliminate ambiguity and thereby facilitate parsing of a select by a computer. Thus, e.g., "ST06" would be "lingo" for the state of Connecticut.

Although lingo is not essential to the invention, it is advantageous because of how it simplifies computer parsing of a select. Even without lingo, though, the use of XML based on an XSD filed enables computer parsing of a select because the tag fields—usually defined in the XSD but sometimes introduced ad hoc (and then usually so as to be self-explanatory)—delimiting tag field values in the XML select indicate the kind of information they delimit.

The following are examples of the use of lingo in a select, although not in the grammar of XML (i.e. the lingo expressions are not shown delimited by tag fields, as they would be in XML):

EXAMPLE OF HOTLINE/RECENCY SELECT

In ordinary English:
Select most recent 30 (60 or 90) day hotlines only.
In list order lingo:
HT30.

EXAMPLE OF GEOGRAPHIC SELECT

In ordinary English:
Select the following States only: CT and NY only, but omit zips 06409 and 06475 and zips referred to in zip omit tape number 123435.
In list order lingo:
Select CT,NY; omit 06409, 06475; and omit ZT#12345.

It is also important to realize that according to the invention, XML is used not merely to indicate values for fields in a select, but also the logic for combining constraints. For example, in the above lingo expression:

Select CT,NY; omit 06409, 06475; and omit ZT#12345 the XML equivalent could have a tag field (as opposed to a field value) of "select" which would delimit the entire select (so that the terminating tag field would occur after ZT#12345). This entire expression would then be characterized as a single element, but an element in which other elements are nested. One such element would be CT, and another NY. Further, the "select" element could indicate the logic "omit" using another element, and containing the further elements zip code 06409 (delimited by tag values indicating it is a zip code) and zip code 06475, and finally ZT#12345 (delimited by tag values indicating it is a tape containing zip codes).

A possible (partial) XSD file fragment (itself an XML document, but not having a corresponding XSD file) indicating the tag fields used in some embodiments of the invention is provided as appendix A. It can be seen that it includes a SelectID tag that identifes the quantity to select on (e.g. State, Job Title, etc.), then the tags SelectType and FormatType, which specify the nature of the value and its format, then the tags Code, DiscreteValue, Description, RangeBegin, and RangeEnd, which contain the value based on SelectType.

The functionality described above for each of the list supply chain entities and also the intermediate node can be implemented as one or more software modules—tpically different modules for the different list supply chain entities—stored in a non-volatile memory, and executed as needed by a processor included in a computer terminal operated by the supply chain entity or serving as the intermediate node, after copying all or part of the software into executable RAM (random access memory). Alternatively, the logic provided by such software can also be provided by an ASIC (application specific integrated circuit). In case of a software implementation, the invention provided as a computer program product including a computer readable storage structure embodying computer program code—i.e. the software—thereon for execution by a computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

APPENDIX A

Fragment of a XSD (XML Schema Description) file showing some tag fields useable in an implementation of the invention:

```
<?xml version="1.0" encoding="utf-8" ?>
- <definitions xmlns:s1="http://microsoft.com/wsdl/types/"
  xmlns:http="http://schemas.xmlsoap.org/wsdl/http/"
  xmlns:soap="http://schemas.xmlsoap.org/wsdl/soap/" xmlns:s="http://www.w3.org/2001/XMLSchema"
  xmlns:s0="http://www.dmedi.net/DotNet/" xmlns:soapenc="http://schemas.xmlsoap.org/soap/encoding/"
  xmlns:tm="http://microsoft.com/wsdl/mime/textMatching/"
  xmlns:mime="http://schemas.xmlsoap.org/wsdl/mime/" targetNamespace="http://www.dmedi.net/DotNet/"
  xmlns="http://schemas.xmlsoap.org/wsdl/">
- <types>
- <s:schema elementFormDefault="qualified" targetNamespace="http://www.dmedi.net/DotNet/">
    <s:import namespace="http://microsoft.com/wsdl/types/" />
- <s:element name="Poll">
    <s:complexType />
    </s:element>
- <s:element name="PollResponse">
- <s:complexType>
- <s:sequence>
```

APPENDIX A-continued

Fragment of a XSD (XML Schema Description) file showing some tag
fields useable in an implementation of the invention:

```
  <s:element minOccurs="0" maxOccurs="1" name="PollResult" type="s0:ResponsePollDocument" />
  </s:sequence>
  </s:complexType>
  </s:element>
- <s:complexType name="ResponsePollDocument">
- <s:complexContent mixed="false">
- <s:extension base="s0:Response">
- <s:sequence>
  <s:element minOccurs="0" maxOccurs="1" name="EdiEnvelope" type="s0:EDI_Envelope" />
  <s:element minOccurs="0" maxOccurs="1" name="EdiDocument" type="s0:EDI_Document" />
  </s:sequence>
  </s:extension>
  </s:complexContent>
  </s:complexType>
- <s:complexType name="Response" abstract="true">
- <s:sequence>
  <s:element minOccurs="1" maxOccurs="1" name="ResponseID" type="s:int" />
  <s:element minOccurs="1" maxOccurs="1" name="ResponseType" type="s0:ResponseType" />
  <s:element minOccurs="1" maxOccurs="1" name="ResponseStatus" type="s0:ResponseStatus" />
  </s:sequence>
  </s:complexType>
- <s:simpleType name="ResponseType">
- <s:restriction base="s:string">
  <s:enumeration value="InvalidType" />
  <s:enumeration value="Login" />
  <s:enumeration value="Logout" />
  <s:enumeration value="NoticePoll" />
  <s:enumeration value="NoticePost" />
  <s:enumeration value="DocumentPoll" />
  <s:enumeration value="DocumentPost" />
  <s:enumeration value="SamplePost" />
  <s:enumeration value="DispatchPoll" />
  <s:enumeration value="DispatchDeliver" />
  </s:restriction>
  </s:simpleType>
- <s:simpleType name="ResponseStatus">
- <s:restriction base="s:string">
  <s:enumeration value="InvalidStatus" />
  <s:enumeration value="LoginSuccess" />
  <s:enumeration value="LoginDenied" />
  <s:enumeration value="LogoutSuccess" />
  <s:enumeration value="NoValidSession" />
  <s:enumeration value="SampleAccepted" />
  <s:enumeration value="SampleRejected" />
  <s:enumeration value="DocumentAccepted" />
  <s:enumeration value="DocumentRejected" />
  <s:enumeration value="DocumentQueueEmpty" />
  <s:enumeration value="DocumentDelivered" />
  <s:enumeration value="NoticeQueueEmpty" />
  <s:enumeration value="NoticeDelivered" />
  <s:enumeration value="NoticeAccepted" />
  <s:enumeration value="NoticeRejected" />
  </s:restriction>
  </s:simpleType>
- <s:complexType name="EDI_Envelope">
- <s:sequence>
  <s:element minOccurs="1" maxOccurs="1" name="DataID" type="s:int" />
  <s:element minOccurs="1" maxOccurs="1" name="DataType" type="s:int" />
  <s:element minOccurs="1" maxOccurs="1" name="ReceiverID" type="s:int" />
  <s:element minOccurs="1" maxOccurs="1" name="SenderID" type="s:int" />
  <s:element minOccurs="1" maxOccurs="1" name="SenderRole" type="s0:EDI_Role" />
  </s:sequence>
  </s:complexType>
- <s:simpleType name="EDI_Role">
- <s:restriction base="s:string">
  <s:enumeration value="NotAssigned" />
  <s:enumeration value="RoleBroker" />
  <s:enumeration value="RoleMailer" />
  <s:enumeration value="RoleManager" />
  <s:enumeration value="RoleServiceBureau" />
  <s:enumeration value="RoleAgency" />
  </s:restriction>
  </s:simpleType>
```

APPENDIX A-continued

Fragment of a XSD (XML Schema Description) file showing some tag
fields useable in an implementation of the invention:

```xml
- <s:complexType name="EDI_Document">
- <s:sequence>
  <s:element minOccurs="1" maxOccurs="1" name="DocType" type="s0:EDI_DocumentType" />
  <s:element minOccurs="1" maxOccurs="1" name="FormType" type="s0:EDI_DocumentForm" />
  <s:element minOccurs="0" maxOccurs="1" name="Reference" type="s0:EDI_Reference" />
  <s:element minOccurs="0" maxOccurs="1" name="Attention" type="s0:EDI_Attention" />
  <s:element minOccurs="0" maxOccurs="1" name="Contact" type="s0:EDI_Contact" />
  <s:element minOccurs="0" maxOccurs="1" name="ShipTo" type="s0:EDI_ShipTo" />
  <s:element minOccurs="0" maxOccurs="1" name="List" type="s0:EDI_List" />
  <s:element minOccurs="0" maxOccurs="1" name="Mailing" type="s0:EDI_Mailing" />
  <s:element minOccurs="0" maxOccurs="1" name="Exchange" type="s0:EDI_Exchange" />
  <s:element minOccurs="0" maxOccurs="1" name="Quantity" type="s0:EDI_Quantity" />
  <s:element minOccurs="0" maxOccurs="1" name="Amount" type="s0:EDI_Amount" />
  <s:element minOccurs="0" maxOccurs="1" name="Shipment" type="s0:EDI_Shipment" />
  <s:element minOccurs="0" maxOccurs="1" name="Comments" type="s0:ArrayOfEDI_Comment" />
  <s:element minOccurs="0" maxOccurs="1" name="StdCharges" type="s0:ArrayOfEDI_StandardCharge" />
  <s:element minOccurs="0" maxOccurs="1" name="StdSelects" type="s0:ArrayOfEDI_StandardSelect" />
  <s:element minOccurs="0" maxOccurs="1" name="LingoSelects" type="s0:ArrayOfEDI_LingoSelect" />
  <s:element minOccurs="0" maxOccurs="1" name="NetNameDetails" type="s0:ArrayOfEDI_NetName" />
  <s:element minOccurs="0" maxOccurs="1" name="AdviceDetails" type="s0:ArrayOfEDI_AdviceDetail" />
  <s:element minOccurs="0" maxOccurs="1" name="OmissionDetails" type="s0:ArrayOfEDI_Omission" />
  <s:element minOccurs="0" maxOccurs="1" name="Reasons" type="s0:ArrayOfInt" />
  </s:sequence>
  </s:complexType>
- <s:simpleType name="EDI_DocumentType">
- <s:restriction base="s:string">
  <s:enumeration value="InvalidType" />
  <s:enumeration value="Order" />
  <s:enumeration value="Invoice" />
  <s:enumeration value="RemittanceAdvice" />
  <s:enumeration value="OrderRevision" />
  <s:enumeration value="OrderAccept" />
  <s:enumeration value="OrderDecline" />
  <s:enumeration value="OrderHold" />
  <s:enumeration value="OrderCancel" />
  <s:enumeration value="CancelAccept" />
  <s:enumeration value="CancelDecline" />
  <s:enumeration value="InvoiceRevision" />
  <s:enumeration value="InvoiceReversal" />
  <s:enumeration value="ClearanceRequest" />
  <s:enumeration value="ClearanceAccept" />
  <s:enumeration value="ClearanceDecline" />
  <s:enumeration value="ShippingNotice" />
  <s:enumeration value="Verification" />
  <s:enumeration value="SamplePosting" />
  <s:enumeration value="DebitMemo" />
  <s:enumeration value="CreditMemo" />
  <s:enumeration value="FinanceCharge" />
  <s:enumeration value="Payment" />
  </s:restriction>
  </s:simpleType>
- <s:simpleType name="EDI_DocumentForm">
- <s:restriction base="s:string">
  <s:enumeration value="InvalidType" />
  <s:enumeration value="Standard" />
  <s:enumeration value="Lingo" />
  </s:restriction>
  </s:simpleType>
- <s:complexType name="EDI_Reference">
- <s:sequence>
  <s:element minOccurs="0" maxOccurs="1" name="DocRef" type="s:string" />
  <s:element minOccurs="0" maxOccurs="1" name="ParentRef" type="s:string" />
  <s:element minOccurs="1" maxOccurs="1" name="DocDate" type="s:dateTime" />
  <s:element minOccurs="1" maxOccurs="1" name="DueDate" type="s:dateTime" />
  </s:sequence>
  </s:complexType>
- <s:complexType name="EDI_Attention">
- <s:sequence>
  <s:element minOccurs="0" maxOccurs="1" name="Attention" type="s:string" />
  <s:element minOccurs="0" maxOccurs="1" name="AttentionPhone" type="s:string" />
  <s:element minOccurs="0" maxOccurs="1" name="AttentionExt" type="s:string" />
  <s:element minOccurs="0" maxOccurs="1" name="AttentionFax" type="s:string" />
```

APPENDIX A-continued

Fragment of a XSD (XML Schema Description) file showing some tag
fields useable in an implementation of the invention:

```xml
<s:element minOccurs="0" maxOccurs="1" name="AttentionEmail" type="s:string" />
<s:element minOccurs="0" maxOccurs="1" name="AttentionAccount" type="s:string" />
</s:sequence>
</s:complexType>
- <s:complexType name="EDI_Contact">
- <s:sequence>
<s:element minOccurs="0" maxOccurs="1" name="Contact" type="s:string" />
<s:element minOccurs="0" maxOccurs="1" name="ContactPhone" type="s:string" />
<s:element minOccurs="0" maxOccurs="1" name="ContactExt" type="s:string" />
<s:element minOccurs="0" maxOccurs="1" name="ContactEmail" type="s:string" />
</s:sequence>
</s:complexType>
- <s:complexType name="EDI_ShipTo">
- <s:sequence>
<s:element minOccurs="0" maxOccurs="1" name="ShipTo_Ref" type="s:string" />
<s:element minOccurs="1" maxOccurs="1" name="ShipTo_Via" type="s0:EDI_ShipVia" />
<s:element minOccurs="0" maxOccurs="1" name="ShipTo_ViaOther" type="s:string" />
<s:element minOccurs="0" maxOccurs="1" name="ShipTo_FullName" type="s:string" />
<s:element minOccurs="0" maxOccurs="1" name="ShipTo_Attention" type="s:string" />
<s:element minOccurs="0" maxOccurs="1" name="ShipTo_Label" type="s:string" />
<s:element minOccurs="0" maxOccurs="1" name="ShipTo_Address1" type="s:string" />
<s:element minOccurs="0" maxOccurs="1" name="ShipTo_Address2" type="s:string" />
<s:element minOccurs="0" maxOccurs="1" name="ShipTo_Address3" type="s:string" />
<s:element minOccurs="0" maxOccurs="1" name="ShipTo_City" type="s:string" />
<s:element minOccurs="0" maxOccurs="1" name="ShipTo_State" type="s:string" />
<s:element minOccurs="0" maxOccurs="1" name="ShipTo_Prov" type="s:string" />
<s:element minOccurs="0" maxOccurs="1" name="ShipTo_PostCode" type="s:string" />
<s:element minOccurs="0" maxOccurs="1" name="ShipTo_Country" type="s:string" />
<s:element minOccurs="0" maxOccurs="1" name="ShipTo_Email" type="s:string" />
<s:element minOccurs="0" maxOccurs="1" name="ShipTo_FTP" type="s:string" />
<s:element minOccurs="0" maxOccurs="1" name="ShipTo_FTPLogin" type="s:string" />
<s:element minOccurs="0" maxOccurs="1" name="ShipTo_FTPPassword" type="s:string" />
<s:element minOccurs="0" maxOccurs="1" name="ShipTo_FTPPath" type="s:string" />
<s:element minOccurs="0" maxOccurs="1" name="ShipTo_FTPFile" type="s:string" />
<s:element minOccurs="1" maxOccurs="1" name="ShipTo_Subscriber" type="s:int" />
</s:sequence>
</s:complexType>
- <s:simpleType name="EDI_ShipVia">
- <s:restriction base="s:string">
<s:enumeration value="NotAssigned" />
<s:enumeration value="NotApplicable" />
<s:enumeration value="Other" />
<s:enumeration value="dmEDI" />
<s:enumeration value="InHouse" />
<s:enumeration value="Email" />
<s:enumeration value="FTP" />
<s:enumeration value="USPSFirstClass" />
<s:enumeration value="USPSPriorityMail" />
<s:enumeration value="USPSExpressMail" />
<s:enumeration value="UPSNextDayAirEarlyAM" />
<s:enumeration value="USPNextDayAir" />
<s:enumeration value="UPSNextDayAirSaver" />
<s:enumeration value="UPS2ndDayAirAM" />
<s:enumeration value="UPS2ndDayAir" />
<s:enumeration value="UPS3DaySelect" />
<s:enumeration value="UPSGround" />
<s:enumeration value="DHLNextDayAM" />
<s:enumeration value="DHLNextDay" />
<s:enumeration value="DHL2ndDay" />
<s:enumeration value="DHLGround" />
<s:enumeration value="FedexSameDay" />
<s:enumeration value="FedexFirstOvernight" />
<s:enumeration value="FedexPriorityOvernight" />
<s:enumeration value="FedexStandardOvernight" />
<s:enumeration value="Fedex2ndDay" />
<s:enumeration value="FedexExpressSaver" />
<s:enumeration value="FedexGround" />
</s:restriction>
</s:simpleType>
- <s:complexType name="EDI_List">
- <s:sequence>
<s:element minOccurs="1" maxOccurs="1" name="ListID" type="s:int" />
<s:element minOccurs="0" maxOccurs="1" name="ListRef" type="s:string" />
<s:element minOccurs="1" maxOccurs="1" name="ListRefType" type="s0:EDI_ListRefType" />
<s:element minOccurs="1" maxOccurs="1" name="ListType" type="s0:EDI_ListType" />
<s:element minOccurs="0" maxOccurs="1" name="ListTypeOther" type="s: string" />
```

APPENDIX A-continued

Fragment of a XSD (XML Schema Description) file showing some tag
fields useable in an implementation of the invention:

```
<s:element minOccurs="0" maxOccurs="1" name="ListTitle" type="s:string" />
<s:element minOccurs="0" maxOccurs="1" name="ListSegment" type="s:string" />
</s:sequence>
</s:complexType>
- <s:simpleType name="EDI_ListRefType">
- <s:restriction base="s:string">
<s:enumeration value="NotAssigned" />
<s:enumeration value="Other" />
<s:enumeration value="Internal" />
<s:enumeration value="Lingo" />
<s:enumeration value="MIN" />
<s:enumeration value="SRDS" />
<s:enumeration value="NextMark" />
</s:restriction>
</s:simpleType>
- <s:simpleType name="EDI_ListType">
- <s:restriction base="s:string">
<s:enumeration value="NotAssigned" />
<s:enumeration value="Other" />
<s:enumeration value="List" />
<s:enumeration value="SpaceAd" />
<s:enumeration value="CardDeck" />
<s:enumeration value="Email" />
<s:enumeration value="PackageInsert" />
<s:enumeration value="RideAlong" />
<s:enumeration value="StatementStuffer" />
</s:restriction>
</s:simpleType>
- <s:complexType name="EDI_Mailing">
- <s:sequence>
<s:element minOccurs="0" maxOccurs="1" name="OfferRef" type="s:string" />
<s:element minOccurs="0" maxOccurs="1" name="OfferTitle" type="s:string" />
<s:element minOccurs="1" maxOccurs="1" name="DateRequired" type="s:dateTime" />
<s:element minOccurs="1" maxOccurs="1" name="DateMailBegin" type="s:dateTime" />
<s:element minOccurs="1" maxOccurs="1" name="DateMailEnd" type="s:dateTime" />
<s:element minOccurs="0" maxOccurs="1" name="MailerRef" type="s:string" />
<s:element minOccurs="0" maxOccurs="1" name="MailerTitle" type="s:string" />
<s:element minOccurs="0" maxOccurs="1" name="MailerOrderNum" type="s:string" />
<s:element minOccurs="1" maxOccurs="1" name="UsageType" type="s0:EDI_UsageType" />
<s:element minOccurs="0" maxOccurs="1" name="KeyCode" type="s:string" />
<s:element minOccurs="1" maxOccurs="1" name="SampleID" type="s:int" />
<s:element minOccurs="1" maxOccurs="1" name="GuaranteeType" type="s0:EDI_GuaranteeType" />
<s:element minOccurs="1" maxOccurs="1" name="DateGuarantee" type="s:dateTime" />
<s:element minOccurs="1" maxOccurs="1" name="NetType" type="s0:EDI_NetType" />
<s:element minOccurs="1" maxOccurs="1" name="NetRate" type="s:float" />
<s:element minOccurs="1" maxOccurs="1" name="MediaType" type="s0:EDI_MediaType" />
<s:element minOccurs="0" maxOccurs="1" name="MediaTypeOther" type="s:string" />
</s:sequence>
</s:complexType>
- <s:simpleType name="EDI_UsageType">
- <s:restriction base="s:string">
<s:enumeration value="NotAssigned" />
<s:enumeration value="Continuation" />
<s:enumeration value="FullRun" />
<s:enumeration value="Test" />
<s:enumeration value="ReTest" />
<s:enumeration value="ReUse" />
</s:restriction>
</s:simpleType>
- <s:simpleType name="EDI_GuaranteeType">
- <s:restriction base="s:string">
<s:enumeration value="NotAssigned" />
<s:enumeration value="NotGuaranteed" />
<s:enumeration value="Guaranteed" />
</s:restriction>
</s:simpleType>
- <s:simpleType name="EDI_NetType">
- <s:restriction base="s:string">
<s:enumeration value="NotAssigned" />
<s:enumeration value="NoNetRateApplies" />
<s:enumeration value="NetRateApplies" />
</s:restriction>
</s:simpleType>
- <s:simpleType name="EDI_MediaType">
- <s:restriction base="s:string">
<s:enumeration value="NotAssigned" />
```

APPENDIX A-continued

Fragment of a XSD (XML Schema Description) file showing some tag
fields useable in an implementation of the invention:

```xml
<s:enumeration value="Other" />
<s:enumeration value="NotApplicable" />
<s:enumeration value="CDROM" />
<s:enumeration value="Diskette" />
<s:enumeration value="DVD" />
<s:enumeration value="MagTape" />
<s:enumeration value="Cartridge" />
<s:enumeration value="DigitalFileCSV" />
<s:enumeration value="DigitalFileTab" />
<s:enumeration value="DigitalFileOtherDelimited" />
<s:enumeration value="DigitalFileFixedWidth" />
<s:enumeration value="DigitalFileOther" />
<s:enumeration value="LabelsCheshire" />
<s:enumeration value="LabelsGum" />
<s:enumeration value="LabelsPressureSensitive" />
<s:enumeration value="LabelsGalley" />
</s:restriction>
</s:simpleType>
- <s:complexType name="EDI_Exchange">
- <s:sequence>
<s:element minOccurs="0" maxOccurs="1" name="ExcRef" type="s:string" />
<s:element minOccurs="1" maxOccurs="1" name="ExcType" type="s0:EDI_ExchangeType" />
<s:element minOccurs="0" maxOccurs="1" name="ExcAttention" type="s:string" />
<s:element minOccurs="1" maxOccurs="1" name="ExcRate" type="s:decimal" />
<s:element minOccurs="1" maxOccurs="1" name="ExcUOP" type="s0:EDI_UOP" />
</s:sequence>
</s:complexType>
- <s:simpleType name="EDI_ExchangeType">
- <s:restriction base="s:string">
<s:enumeration value="NotAssigned" />
<s:enumeration value="Exchange" />
<s:enumeration value="NoExchange" />
<s:enumeration value="Split" />
<s:enumeration value="Reciprocal" />
</s:restriction>
</s:simpleType>
- <s:simpleType name="EDI_UOP">
- <s:restriction base="s:string">
<s:enumeration value="NotAssigned" />
<s:enumeration value="PerThousand" />
<s:enumeration value="FlatFee" />
<s:enumeration value="PerUnit" />
</s:restriction>
</s:simpleType>
- <s:complexType name="EDI_Quantity">
- <s:sequence>
<s:element minOccurs="1" maxOccurs="1" name="Quantity" type="s:int" />
<s:element minOccurs="1" maxOccurs="1" name="QuantityType" type="s0:EDI_QuantityType" />
<s:element minOccurs="1" maxOccurs="1" name="QuantityRent" type="s:int" />
<s:element minOccurs="1" maxOccurs="1" name="QuantityExc" type="s:int" />
</s:sequence>
</s:complexType>
- <s:simpleType name="EDI_QuantityType">
- <s:restriction base="s:string">
<s:enumeration value="NotAssigned" />
<s:enumeration value="All" />
<s:enumeration value="EveryNth" />
<s:enumeration value="Maximum" />
<s:enumeration value="StopAt" />
<s:enumeration value="AB" />
<s:enumeration value="SubjectToCount" />
</s:restriction>
</s:simpleType>
- <s:complexType name="EDI_Amount">
- <s:sequence>
<s:element minOccurs="1" maxOccurs="1" name="StandardAmount" type="s:decimal" />
<s:element minOccurs="1" maxOccurs="1" name="SelectAmount" type="s:decimal" />
<s:element minOccurs="1" maxOccurs="1" name="TaxAmount" type="s:decimal" />
<s:element minOccurs="1" maxOccurs="1" name="TotalAmount" type="s:decimal" />
</s:sequence>
</s:complexType>
- <s:complexType name="EDI_Shipment">
- <s:sequence>
<s:element minOccurs="1" maxOccurs="1" name="DateShipped" type="s:dateTime" />
<s:element minOccurs="1" maxOccurs="1" name="ShippedVia" type="s0:EDI_ShipVia" />
<s:element minOccurs="0" maxOccurs="1" name="TrackingNumber" type="s:string" />
```

APPENDIX A-continued

Fragment of a XSD (XML Schema Description) file showing some tag
fields useable in an implementation of the invention:

```
  <s:element minOccurs="1" maxOccurs="1" name="QuantityTotal" type="s:int" />
  <s:element minOccurs="1" maxOccurs="1" name="QuantityShipped" type="s:int" />
  </s:sequence>
  </s:complexType>
- <s:complexType name="ArrayOfEDI_Comment">
- <s:sequence>
  <s:element minOccurs="0" maxOccurs="unbounded" name="EDI_Comment" nillable="true"
type="s0:EDI_Comment" />
  </s:sequence>
  </s:complexType>
- <s:complexType name="EDI_Comment">
- <s:sequence>
  <s:element minOccurs="1" maxOccurs="1" name="CommentType" type="s0:EDI_CommentType" />
  <s:element minOccurs="0" maxOccurs="1" name="Comment" type="s:string" />
  </s:sequence>
  </s:complexType>
- <s:simpleType name="EDI_CommentType">
- <s:restriction base="s:string">
  <s:enumeration value="NotAssigned" />
  <s:enumeration value="General" />
  <s:enumeration value="OrderInstruction" />
  <s:enumeration value="Shipping" />
  <s:enumeration value="Quantity" />
  </s:restriction>
  </s:simpleType>
- <s:complexType name="ArrayOfEDI_StandardCharge">
- <s:sequence>
  <s:element minOccurs="0" maxOccurs="unbounded" name="EDI_StandardCharge" nillable="true"
type="s0:EDI_StandardCharge" />
  </s:sequence>
  </s:complexType>
- <s:complexType name="EDI_StandardCharge">
- <s:sequence>
  <s:element minOccurs="1" maxOccurs="1" name="ChargeType" type="s0:EDI_StandardChargeType" />
  <s:element minOccurs="1" maxOccurs="1" name="Quantity" type="s:float" />
  <s:element minOccurs="1" maxOccurs="1" name="Rate" type="s:decimal" />
  <s:element minOccurs="1" maxOccurs="1" name="UOP" type="s0:EDI_UOP" />
  <s:element minOccurs="1" maxOccurs="1" name="GrossAmount" type="s:decimal" />
  <s:element minOccurs="1" maxOccurs="1" name="Discount" type="s:decimal" />
  <s:element minOccurs="1" maxOccurs="1" name="NetAmount" type="s:decimal" />
  <s:element minOccurs="1" maxOccurs="1" name="DiscountRate" type="s:float" />
  <s:element minOccurs="0" maxOccurs="1" name="Description" type="s:string" />
  </s:sequence>
  </s:complexType>
- <s:simpleType name="EDI_StandardChargeType">
- <s:restriction base="s:string">
  <s:enumeration value="NotAssigned" />
  <s:enumeration value="Other" />
  <s:enumeration value="RentalCharge" />
  <s:enumeration value="ExchangeCharge" />
  <s:enumeration value="MediaFormatCharge" />
  <s:enumeration value="MediaDeliveryCharge" />
  </s: restriction>
  </s:simpleType>
- <s:complexType name="ArrayOfEDI_StandardSelect">
- <s:sequence>
  <s:element minOccurs="0" maxOccurs="unbounded" name="EDI_StandardSelect" nillable="true"
type="s0:EDI_StandardSelect" />
  </s:sequence>
  </s:complexType>
- <s:complexType name="EDI_StandardSelect">
- <s:sequence>
  <s:element minOccurs="0" maxOccurs="1" name="SelectRef" type="s:string" />
  <s:element minOccurs="0" maxOccurs="1" name="Specification" type="s:string" />
  <s:element minOccurs="1" maxOccurs="1" name="Quantity" type="s:int" />
  <s:element minOccurs="1" maxOccurs="1" name="Rate" type="s:decimal" />
  <s:element minOccurs="1" maxOccurs="1" name="UOP" type="s0:EDI_UOP" />
  <s:element minOccurs="1" maxOccurs="1" name="Price" type="s:decimal" />
  <s:element minOccurs="1" maxOccurs="1" name="Discount" type="s:decimal" />
  <s:element minOccurs="1" maxOccurs="1" name="NetPrice" type="s:decimal" />
  <s:element minOccurs="1" maxOccurs="1" name="DiscountRate" type="s:float" />
  </s:sequence>
  </s:complexType>
```

APPENDIX A-continued

Fragment of a XSD (XML Schema Description) file showing some tag
fields useable in an implementation of the invention:

```
- <s:complexType name="ArrayOfEDI_LingoSelect">
- <s:sequence>
  <s:element minOccurs="0" maxOccurs="unbounded" name="EDI_LingoSelect" nillable="true" type="s0:EDI_LingoSelect" />
  </s:sequence>
  </s:complexType>
- <s:complexType name="EDI_LingoSelect">
- <s:sequence>
  <s:element minOccurs="1" maxOccurs="1" name="SelectID" type="s:int" />
  <s:element minOccurs="1" maxOccurs="1" name="SelectType" type="s0:EDI_SelectType" />
  <s:element minOccurs="0" maxOccurs="1" name="SelectRef" type="s:string" />
  <s:element minOccurs="0" maxOccurs="1" name="Description" type="s:string" />
  <s:element minOccurs="1" maxOccurs="1" name="FormatType" type="s0:EDI_FormatType" />
  <s:element minOccurs="0" maxOccurs="1" name="RangeBegin" type="s:string" />
  <s:element minOccurs="0" maxOccurs="1" name="RangeEnd" type="s:string" />
  <s:element minOccurs="0" maxOccurs="1" name="Code" type="s:string" />
  <s:element minOccurs="0" maxOccurs="1" name="DiscreteValue" type="s:string" />
  <s:element minOccurs="1" maxOccurs="1" name="Quantity" type="s:int" />
  <s:element minOccurs="1" maxOccurs="1" name="Rate" type="s:decimal" />
  <s:element minOccurs="1" maxOccurs="1" name="UOP" type="s0:EDI_UOP" />
  <s:element minOccurs="1" maxOccurs="1" name="Price" type="s:decimal" />
  <5:element minOccurs="1" maxOccurs="1" name="Discount" type="s:decimal" />
  <s:element minOccurs="1" maxOccurs="1" name="NetPrice" type="s:decimal" />
  <s:element MinOccurs="1" maxOccurs="1" name="DiscountRate" type="s:float" />
  </s:sequence>
  </s:complexType>
- <s:simpleType name="EDI_SelectType">
- <s:restriction base="s:string">
  <s:enumeration value="NotAssigned" />
  <s:enumeration value="Descriptive" />
  <s:enumeration value="Code" />
  <s:enumeration value="DiscreteValue" />
  <s:enumeration value="Range" />
  </s:restriction>
  </s:simpleType>
- <s:simpleType name="EDI_FormatType">
- <s:restriction base="s:string">
  <s:enumeration value="NotAssigned" />
  <s:enumeration value="FormatString" />
  <s:enumeration value="FormatDateTime" />
  <s:enumeration value="FormatDate" />
  <s:enumeration value="FormatTime" />
  <s:enumeration value="FormatInteger" />
  <s:enumeration value="FormatReal" />
  <s:enumeration value="FormatMoney" />
  <s:enumeration value="FormatBoolean" />
  </s:restriction>
  </s:simpleType>
- <s:complexType name="ArrayOfEDI_NetName">
- <s:sequence>
  <s:element minOccurs="0" maxOccurs="unbounded" name="EDI_NetName" nillable="true" type="s0:EDI_NetName" />
  </s:sequence>
  </s:complexType>
- <s:complexType name="EDI_NetName">
- <s:sequence>
  <s:element minOccurs="1" maxOccurs="1" name="NetNameType" type="s0:EDI_NetNameType" />
  <s:element minOccurs="1" maxOccurs="1" name="Quantity" type="s:int" />
  <s:element minOccurs="0" maxOccurs="1" name="Description" type="s:string" />
  </s:sequence>
  </s:complexType>
- <s:simpleType name="EDI_NetNameType">
- <s:restriction base="s:string">
  <s:enumeration value="NotAssigned" />
  <s:enumeration value="Other" />
  <s:enumeration value="TotalDropped" />
  <s:enumeration value="TotalClean" />
  <s:enumeration value="TotalMailed" />
  <s:enumeration value="HouseMatches" />
  <s:enumeration value="Exchanges" />
  <s:enumeration value="IntraDupes" />
  <s:enumeration value="InterDupes" />
  <s:enumeration value="PanderNames" />
  </s:restriction>
  </s:simpleType>
```

APPENDIX A-continued

Fragment of a XSD (XML Schema Description) file showing some tag
fields useable in an implementation of the invention:

```
- <s:complexType name="ArrayOfEDI_AdviceDetail">
- <s:sequence>
  <s:element minOccurs="0" maxOccurs="unbounded" name="EDI_AdviceDetail" nillable="true"
type="s0:EDI_AdviceDetail" />
  </s:sequence>
  </s:complexType>
- <s:complexType name="EDI_AdviceDetail">
- <s:sequence>
  <s:element minOccurs="1" maxOccurs="1" name="DocType" type="s0:EDI_DocumentType" />
  <s:element minOccurs="0" maxOccurs="1" name="DocRef" type="s:string" />
  <s:element minOccurs="0" maxOccurs="1" name="ParentRef" type="s:string" />
  <s:element minOccurs="0" maxOccurs="1" name="InvoiceRef" type="s:string" />
  <s:element minOccurs="0" maxOccurs="1" name="Description" type="s:string" />
  <s:element minOccurs="1" maxOccurs="1" name="DocumentAmount" type="s:decimal" />
  <s:element minOccurs="1" maxOccurs="1" name="AmountApplied" type="s:decimal" />
  <s:element minOccurs="1" maxOccurs="1" name="NetAmount" type="s:decimal" />
  </s:sequence>
  </s:complexType>
- <s:complexType name="ArrayOfEDI_Omission.>
- <s:sequence>
  <s:element minOccurs="0" maxOccurs="unbounded" name="EDI_Omission" nillable="true"
type="s0:EDI_Omission" />
  </s:sequence>
  </s:complexType>
- <s:complexType name="EDI_Omission">
- <s:sequence>
  <s:element minOccurs="0" maxOccurs="1" name="OrderDocRef" type="s:string" />
  </s:sequence>
  </s:complexType>
- <s:complexType name="ArrayOfInt">
- <s:sequence>
  <s:element minOccurs="0" maxOccurs="unbounded" name="int" type="s:int" />
  </s:sequence>
  </s:complexType>
  <s:element name="SessionHeader" type="s0:SessionHeader" />
- <s:complexType name="SessionHeader">
- <s:sequence>
  <s:element minOccurs="1" maxOccurs="1" name="SessionGuid" type="sl:guid" />
  </s:sequence>
  </s:complexType>
- <s:element name="Post">
- <s:complexType>
- <s:sequence>
  <s:element minOccurs="0" maxOccurs="1" name="myRequest" type="s0:ReqUestPostDocument" />
  </s:sequence>
  </s:complexType>
  </s:element>
- <s:complexType name="RequestPostDocument">
- <s:complexContent mixed="false">
- <s:extension base="s0:Request">
- <s:sequence>
  <s:element minOccurs="0" maxOccurs="1" name="EdiEnvelope" type="s0:EDI_Envelope" />
  <s:element minOccurs="0" maxOccurs="1" name="EdiDocument" type="s0:EDI_Document" />
  </s:sequence>
  </s:extension>
  </s: complexContent>
  </s:complexType>
  <s:complexType name="Request" abstract="true" />
- <s:element name="PostResponse">
- <s:complexType>
- <s:sequence>
  <s:element minOccurs="0" maxOccurs="1" name="PostResult" type="s0:ResponsePostDocument" />
  </s:sequence>
  </s:complexType>
  </s:element>
- <s:complexType name="ResponsePostDocument">
- <s:complexContent mixed="false">
- <s:extension base="s0:Response">
- <s:sequence>
  <s:element minOccurs="1" maxOccurs="1" name="DocID" type="s:int" />
  <s:element minOccurs="1" maxOccurs="1" name="DocType" type="s0:EDI_DocumentType" />
  <s:element minOccurs="0" maxOccurs="1" name="DocRef" type="s:string" />
  <s:element minOccurs="0" maxOccurs="1" name="DocErrors" type="s0:ArrayOfEDI_DocError" />
  </s:sequence>
```

APPENDIX A-continued

Fragment of a XSD (XML Schema Description) file showing some tag
fields useable in an implementation of the invention:

```xml
</s:extension>
</s: complexContent>
</s:complexType>
- <s:complexType name="ArrayOfEDI_DocError">
- <s:sequence>
<s:element minOccurs="0" maxOccurs="unbounded" name="EDI_DocError" type="s0:EDI_DocError" />
</s:sequence>
</s:complexType>
- <s:complexType name="EDI_DocError">
- <s:sequence>
<s:element minOccurs="1" maxOccurs="1" name="ErrorCode" type="s0:EDI_DocErrorCode" />
<s:element minOccurs="1" maxOccurs="1" name="ComponentID" type="s:int" />
<s:element minOccurs="1" maxOccurs="1" name="MemberID" type="s:int" />
</s:sequence>
</s:complexType>
- <s:simpleType name="EDI_DocErrorCode">
- <s:restriction base="s:string">
<s:enumeration value="NotAssigned" />
<s:enumeration value="SubscriberInvalid" />
<s:enumeration value="SubscriberDoesNotExist" />
<s:enumeration value="DocumentDoesNotExist" />
<s:enumeration value="DocumentTypeInvalid" />
<s:enumeration value="DocumentFormInvalid" />
<s:enumeration value="DocumentAlreadyExists" />
<s:enumeration value="DocumentNotSupported" />
<s:enumeration value="ParentDoesNotExist" />
<s:enumeration value="ComponentNotDefined" />
<s:enumeration value="MemberRequiredMissing" />
<s:enumeration value="MemberInvalidValue" />
<s:enumeration value="MemberInvalidSign" />
<s:enumeration value="MemberInvalidType" />
<s:enumeration value="MemberConversionError" />
<s:enumeration value="MemberFormatError" />
</s:restriction>
</s:simpleType>
</s:schema>
- <s:schema elementFormDefault="qualified" targetNamespace="http://microsoft.com/wsdl/types/">
- <s:simpleType name="guid">
- <s:restriction base="s:string">
<s:pattern value="[0-9a-fA-F]{8}-[0-9a-fA-F]{4}-[0-9a-fA-F]{4}-[0-9a-fA-F]{4}-[0-9a-fA-F]{12}" />
</s: restriction>
</s:simpleType>
</s:schema>
</types>
- <message name="PollSoapIn">
<part name="parameters" element="s0:Poll" />
</message>
- <message name="PollSoapOut">
<part name="parameters" element="s0:PollResponse" />
</message>
- <message name="PollSessionHeader">
<part name="SessionHeader" element="s0:SessionHeader" />
</message>
- <message name="PostSoapIn">
<part name="parameters" element="s0:Post" />
</message>
- <message name="PostSoapOut">
<part name="parameters" element="s0:PostResponse" />
</message>
- <message name="PostSessionHeader">
<part name="SessionHeader" element="s0:SessionHeader" />
</message>
- <portType name="DocumentSoap">
- <operation name="Poll">
<documentation>poll for the next available document</documentation>
<input message="s0:PollSoapIn" />
<output message="s0:PollSoapOut" />
</operation>
- <operation name="Post">
<documentation>post a specific document</documentation>
<input message="s0:PostSoapIn" />
<output message="s0:PostSoapOut" />
</operation>
</portType>
```

APPENDIX A-continued

Fragment of a XSD (XML Schema Description) file showing some tag fields useable in an implementation of the invention:

```
- <binding name="DocumentSoap" type="s0:DocumentSoap">
  <soap:binding transport="http://schemas.xmlsoap.org/soap/http" style="document" />
- <operation name="Poll">
  <soap:operation soapAction="http://www.dmedi.net/DotNet/Poll" style="document" />
- <input>
  <soap:body use="literal" />
  <soap:header message="s0:PollSessionHeader" part="SessionHeader" use="literal" />
  </input>
- <output>
  <soap:body use="literal" />
  </output>
  </operation>
- <operation name="Post">
  <soap:operation soapAction="http://www.dmedi.net/DotNet/Post" style="document" />
- <input>
  <soap:body use="literal" />
  <soap:header message="s0:PostSessionHeader" part="SessionHeader" use="literal" />
  </input>
- <output>
  <soap:body use="literal" />
  </output>
  </operation>
  </binding>
- <service name="Document">
  <documentation><b>A web service that polls, posts and retrieves documents.</b></documentation>
- <port name="DocumentSoap" binding="s0:DocumentSoap">
  <soap:address location="http://localhost/document.asmx" />
  </port>
  </service>
  </definitions>
```

What is claimed is:

1. A list-specifying terminal, comprising processor and a memory including computer program code, the memory and the computer program code configured to, with the processor, cause the list-specifying terminal to perform:

providing, responsive to a request for a subset of a list based on at least one criteria identifying the subset of the list from a first list industry entity in a list rental industry supply chain, a native format order for the subset of the list;

providing, responsive to the native format order, an extensible markup language order for the subset of the list indicating the subset of the list using an extensible markup language and at least one tag value in the extensible markup language corresponding to the at least one criteria based on a select filter;

encapsulating, responsive to the extensible markup language order, the extensible markup language order in a message having a header indicating a destination and indicating that the message includes the extensible markup language order, and communicating the message to a second list industry entity in the list rental industry supply chain over a communication channel, wherein the extensible markup language order is configured for receipt by receiving and de-translating means for receiving the extensible markup language order, and for translating the extensible markup language order into the native format; and wherein the message is configured for receipt by checking means for validating or not validating the extensible markup language order based on a predetermined extensible markup language schema description, and for providing the message encapsulating the validated or non-validated extensible markup language order, wherein the header in the message further indicates that the message includes the validated or non-validated extensible markup language order; and wherein the message encapsulating the validated or non-validated extensible markup language order is routed to the list-specifying terminal if the extensible markup language order is not validated, and routed to a next list industry entity of the list rental industry supply chain if the extensible markup language order is validated.

2. A list-specifying terminal as in claim 1, wherein the extensible markup language provides the select filter using the at least one tag value chosen from a predetermined set of tag values.

3. A list-specifying terminal as in claim 2, wherein the predetermined set of tag values and predetermined definitions for the tag values are provided by an extensible markup language schema description file.

4. A list-specifying terminal as in claim 1, wherein the native format is a binary-encoded representation of data in terms of data structures defined within a computer program compiled into machine language, for providing computer processor instructions for the ordering means.

5. A list-specifying terminal as in claim 1, wherein the list-specifying terminal is configured to use computer programming language providing classes of objects for use in indicating instructions to a computer.

6. A list-specifying terminal as in claim 1, wherein the list-specifying terminal is configured to use computer programming language that is or is a variant of visual basic or C++ or C-sharp.

7. A list-specifying terminal as in claim 1, further comprising a receiving and de-translating means, for receiving the extensible markup language order, and for translating the order into the native format.

8. A list-specifying terminal as in claim 1, wherein the native format order is transferred via an application program interface.

9. A list-specifying terminal as in claim 1, wherein the native format order is obtained via a data store.

10. A list-providing terminal, comprising a processor and a memory including computer program code, the memory and the computer program code configured to, with the processor, cause the list-providing terminal to perform:
receiving an extensible markup language order from a first list industry entity in a list rental industry supply chain for a subset of a list requesting the subset of the list using an extensible markup language and at least one tag value in the extensible markup language corresponding to at least one criteria identifying the subset of the list based on a select filter, wherein the extensible markup language order is encapsulated in a message having a header indicating a destination and indicating that the message includes the extensible markup language order for the subset of the list, and wherein the extensible markup language order is provided from a request for the subset of the list based on at least one criteria identifying the subset of the list from the first list industry entity;
translating the order into a native format order;
validating or not validating the extensible markup language order based on a predetermined extensible markup language schema description, for providing the message encapsulating the validated or non-validated extensible markup language order, wherein the header in the message further indicates that the message includes the validated or non-validated extensible markup language order; and
a list providing means, responsive to a stored copy of the list, for providing the subset of the list based on the native format order to a second list industry entity in the list rental industry supply chain if the extensible markup language order is validated, and for providing the message to the first list industry entity if the extensible markup language order is not validated.

11. An intermediate-node server, comprising a processor and a memory including computer program code, the memory and the computer program code configured to, with the processor, cause the intermediate-node server to perform:
receiving a message having a header indicating a destination and indicating that the message includes an extensible markup language order for a subset of a list from a sending list industry entity of a list rental supply chain, wherein the message encapsulates the extensible markup language order for the subset of the list requesting the subset of the list using an extensible markup language and at least one tag value in the extensible markup language corresponding to at least one criteria identifying the subset of the list based on a select filter, and wherein the extensible markup language order is provided from a request for the subset of the list based on at least one criteria identifying the subset of the list from the sending list industry entity;
validating or not validating the extensible markup language order based on a predetermined extensible markup language schema description, for providing the message encapsulating the validated or non-validated extensible markup language order, wherein the message comprises a header indicating a destination and indicating that the message includes the validated or non-validated extensible markup language order; and
routing, responsive to the message encapsulating the validated or non-validated extensible markup language order, the message to the sending list industry entity of the list rental supply chain if the extensible markup language order is not validated, and for routing the message to a next list industry entity of the list rental supply chain if the extensible markup language order is validated;
wherein the extensible markup language order is configured for receipt by de-translating means for receiving the extensible markup language order, and for translating the extensible markup language order into the native format.

12. An intermediate-node server, as in claim 11, further comprising means for storing the extensible markup language schema description and for making the extensible markup language schema description available to a process communicatively coupled to the server.

13. A system, comprising:
a list ordering terminal comprising a processor and a memory including computer program code, the memory and the computer program code configured to, with the processor, cause the list ordering terminal to perform:
providing, responsive to a request for a subset of a list based on at least one criteria identifying the subset of the list from a first list industry entity in a list rental industry supply chain, a native format order for the subset of the list;
providing, responsive to the native format order for the subset of the list, an extensible markup language order for the subset of the list indicating the subset of the list using an extensible markup language and at least one tag value in the extensible markup language corresponding to the at least one criteria based on a select filter;
encapsulating, responsive to the extensible markup language order, the extensible markup language order in a message having a header indicating a destination and indicating that the message includes the extensible markup language order for the subset of the list, and
communicating the message over a communication channel to a second list industry entity in the list rental industry supply chain;
wherein the system further comprises a service bureau terminal comprising a processor and a memory including computer program code, the memory and the computer program code configured to, with the processor, cause the service bureau terminal to perform:
receiving the extensible markup language order, and for translating the extensible markup language order into the native format; and
providing, responsive to a stored copy of the list, the subset of the list based on the indication of the subset of the list in the native format;
wherein the system further comprises an intermediate node server comprising a processor and a memory including computer program code, the memory and the computer program code configured to, with the processor, cause the intermediate-node server to perform:
validating or not validating, responsive to the message from the list ordering terminal, wherein the message encapsulates the extensible markup language order for the subset of the list indicating the subset of the list using an extensible markup language, the extensible markup language order based on a predetermined extensible markup language schema description, for providing the message encapsulating the validated or non-validated extensible markup language order, wherein the header in the message further indicates that the message includes the validated or non-validated extensible markup language order; and routing, responsive to the message encapsulating the validated or non-validated extensible markup language order, the message to the list ordering terminal if the extensible markup language order is not validated, and routing the message to a next list industry entity of the list rental industry supply chain if the extensible markup language order is validated.

14. A method, comprising:

providing native format order for a subset of a list in response to a request for the subset of the list based on at least one criteria identifying the subset of the list from a first list industry entity in a list rental industry supply chain;

translating the native format order into an extensible markup language order for the subset of the list indicating the subset of the list using an extensible markup language and at least one tag value in the extensible markup language corresponding to the at least one criteria based on a select filter; and encapsulating the extensible markup language order in a message having a header indicating a destination and indicating that the message includes the extensible markup language order for the subset of the list, and for communicating the message over a communication channel to a second list industry entity in the list rental industry supply chain;

wherein the extensible markup language order is configured for receipt by receiving and de-translating means for receiving the extensible markup language order, and for translating the extensible markup language order into the native format wherein the subset of the list is provided based on the indication of the subset of the list in the native format;

wherein the message is configured for receipt by checking means for validating or not validating the extensible markup language order based on a predetermined extensible markup language schema description, and for providing the message encapsulating the validated or non-validated extensible markup language order, wherein the header in the message further indicates that the message includes the validated or non-validated extensible markup language order, and wherein the message is configured for routing to the first list industry entity if the extensible markup language order is not validated, and configured for routing to a next list industry entity of the list rental industry supply chain if the extensible markup language order is validated.

15. A method, comprising:

receiving an extensible markup language order for a subset of a list requesting the subset of the list using an extensible markup language and at least one tag value in the extensible markup language value corresponding to at least one criteria identifying the subset of the list based on a select filter from a first list industry entity in a list rental industry supply chain, wherein the extensible markup language order is encapsulated in a message having a header indicating a destination and indicating that the message includes the extensible markup language order for the subset of the list, and wherein the extensible markup language order is provided from a request for the subset of the list based on the at least one criteria identifying the subset of the list from the first list industry entity;

translating the extensible markup language order into a native format order;

validating or not validating the extensible markup language order based on a predetermined extensible markup language schema description, providing the message encapsulating the validated or non-validated extensible markup language order, wherein the header in the message further indicates that the message includes the validated or non-validated extensible markup language order, and providing the subset of the list based on the native format order to a second list industry entity in the list rental industry supply chain if the extensible markup language order is validated, and providing the message to the first list industry entity if the extensible markup language order is not validated.

16. A method, comprising:

a receiving and checking step, responsive to a message having a header indicating a destination and indicating that the message includes an extensible markup language order for a subset of a list from a sending list industry entity of a list rental industry supply chain wherein the message encapsulates the extensible markup language order for the subset of the list requesting the subset of the list using an extensible markup language and at least one tag value in the extensible markup language corresponding to at least one criteria identifying the subset of the list based on a select filter, wherein the extensible markup language order is provided from a request for the subset of the list based on at least one criteria identifying the subset of the list from the sending list industry entity;

validating or not validating the extensible markup language order based on a predetermined extensible markup language schema description, for providing the message encapsulating the validated or non-validated extensible markup language order, wherein the header in the message further indicates that the message includes the validated or non-validated extensible markup language order;

a routing step, responsive to the message encapsulating the validated or non-validated extensible markup language order, for routing the message to the sending list industry entity of the list rental industry supply chain if the extensible markup language order is not validated, and for routing the message to a next list industry entity of the list rental industry supply chain if the extensible markup language order is validated; and translating the extensible markup language order into the native format.

17. A computer readable medium having computer instructions stored thereon, executed by a computer processor, for performing steps comprising:

providing native format order for a subset of a list in response to a request of the subset of the list based on at least one criteria identifying the subset of the list from a first list industry entity in a list rental industry supply chain;

translating the native format order into an extensible markup language order for the subset of the list indicating the subset of the list using an extensible markup language and at least one tag value in the extensible markup language corresponding to the at least one criteria based on a select filter; and encapsulating the extensible markup language order in a message having a header indicating a destination and indicating that the message includes the extensible markup language order for the subset of the list, and for communicating the message over a communication channel to a second list industry entity in the list rental industry supply chain;

wherein the extensible markup language order is configured for receipt by receiving and de-translating means for receiving the extensible markup language order, and for translating the extensible markup language order into the native format, wherein the subset of the list is provided based on the indication of the subset of the list in the native format; and wherein the message is configured for receipt by checking means for validating or not validating the extensible markup language order based on a predetermined extensible markup language schema description, and for providing the message encapsulating the validated or non-validated extensible markup language order, wherein the header in the message further indicates that the message includes the validated or non-validated extensible markup language order; and wherein the message is configured for routing to the first list industry entity if the extensible markup language order is not validated, and configured for routing to a next list industry entity of the list rental industry supply chain if the extensible markup language order is validated.

18. A computer readable medium having computer instructions stored thereon, executed by a computer processor, for performing steps comprising:

receiving an extensible markup language order for a subset of a list requesting the subset of the list using an extensible markup language and at least one tag value in the extensible markup language corresponding to at least one criteria identifying the subset of the list based on a select filter from a first list industry entity in a list rental industry supply chain, wherein the extensible markup language order is encapsulated in a message having a header indicating a destination and indicating that the message includes the extensible markup language order for the subset of the list, and wherein the extensible markup language order is provided from a request for the subset of the list based on at least one criteria identifying the subset of the list from the first list industry entity;

translating the extensible markup language order into a native format order;

validating or not validating the extensible markup language order based on a predetermined extensible markup language schema description, for providing the message encapsulating the validated or non-validated extensible markup language order, wherein the header in the message further indicates that the message includes the validated or non-validated extensible markup language order; and providing the subset of the list based on the indication of the subset of the list in the native format to a second list industry entity in the list rental industry supply chain if the extensible markup language order is validated, and providing the message to the first list industry entity if the extensible markup language order is not validated;

wherein the message is configured for receipt by checking means for validating or not validating the extensible markup language order based on a predetermined extensible markup language schema description, and for providing the message encapsulating the validated or non-validated extensible markup language order, wherein the header in the message further indicates that the message includes the validated or non-validated extensible markup language order.

19. A computer readable medium having computer instructions stored thereon, executed by a computer processor, for performing steps comprising:

a receiving a message from a sending list industry entity of a list rental industry supply chain wherein the message encapsulates an extensible markup language order for a subset of a list requesting the subset of the list using an extensible markup language and at least one tag value in the extensible markup language corresponding to at least one criteria identifying the subset of the list based on a select filter, and wherein the extensible markup language order is provided from a request for the subset of the list based on the at least one criteria identifying the subset of the list from the first list industry entity;

translating the extensible markup language order into a native format order;

validating or not validating the extensible markup language order based on a predetermined extensible markup language schema description, providing the message encapsulating the validated or non-validated extensible markup language order, wherein the header in the message further indicates that the message includes the validated or non-validated extensible markup language order; and routing the message to the sending list industry entity of the list rental industry supply chain if the extensible markup language order is not validated, and routing the message to a next list industry entity of the list rental industry supply chain if the extensible markup language order is validated.

* * * * *

UNITED STATES PATENT AND TRADEMARK OFFICE
CERTIFICATE OF CORRECTION

| | | |
|---|---|---|
| PATENT NO. | : 7,836,027 B2 | Page 1 of 1 |
| APPLICATION NO. | : 11/474052 | |
| DATED | : November 16, 2010 | |
| INVENTOR(S) | : Richard A. LePoutre et al. | |

It is certified that error appears in the above-identified patent and that said Letters Patent is hereby corrected as shown below:

On Title Page, reference "US 2004/0210818, 10/2004, Jones et al., 715/500" should be listed in References Cited section Signed and Sealed this
Twenty-ninth Day of March, 2011

David J. Kappos
*Director of the United States Patent and Trademark Office*